(12) United States Patent
Takemura et al.

(10) Patent No.: US 11,501,337 B2
(45) Date of Patent: Nov. 15, 2022

(54) ROUTE-BASED INFORMATION SLOTTING BASED ON PREDICTED ACCEPTANCE

(71) Applicant: International Business Machines Corporation, Armonk, NY (US)

(72) Inventors: Reiya Takemura, Tokyo (JP); Mari Abe Fukuda, Tokyo (JP); Taku Sasaki, Tokyo (JP); Kenichi Takasaki, Tokyo (JP); Tsend Ochir Bat Ulzii, Tokyo (JP); Yuhko Kanoh Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 16/918,541

(22) Filed: Jul. 1, 2020

(65) Prior Publication Data
US 2022/0005076 A1   Jan. 6, 2022

(51) Int. Cl.
*G06Q 30/00* (2012.01)
*G06Q 30/02* (2012.01)
*G05B 19/418* (2006.01)

(52) U.S. Cl.
CPC ..... *G06Q 30/0266* (2013.01); *G06Q 30/0255* (2013.01); *G06Q 30/0261* (2013.01); *G06Q 30/0264* (2013.01)

(58) Field of Classification Search
CPC .......... G06Q 30/0266; G06Q 30/0261; G06Q 30/0264; G06Q 30/0255
See application file for complete search history.

(56) References Cited

U.S. PATENT DOCUMENTS

| | | | |
|---|---|---|---|
| 9,965,768 | B1 | 5/2018 | Doane |
| 2007/0050248 | A1 | 3/2007 | Huang |
| 2009/0299857 | A1 | 12/2009 | Brubaker |
| 2010/0332315 | A1 | 12/2010 | Kamar |

(Continued)

FOREIGN PATENT DOCUMENTS

| | | |
|---|---|---|
| JP | 2007066311 A | 3/2007 |
| JP | 2009092608 A | 4/2009 |

(Continued)

OTHER PUBLICATIONS

"Data-Oriented Mobile Crowdsensing: A Comprehensive Survey". (Year: 2019).*

(Continued)

*Primary Examiner* — Maria V Vanderhorst
(74) *Attorney, Agent, or Firm* — Haley J. McClory (57) ABSTRACT

A processor may generate, based on a predicted route of a user, a timeslot for presenting information to the user. The predicted route may be associated with a route segment, and the timeslot may be associated with the route segment. The processor may match one or more proposals to the timeslot associated with the route segment. The one or more proposals may be matched, at least in part, based on proposal criteria set by a proposal criteria user associated with the proposal. The processor may predict an acceptance potentiality of the user. The processor may select a subset of the one or more proposals. The processor may provide the selected subset of the one or more proposals. The selected subset may be provided, at least in part, based on the acceptance potentiality.

19 Claims, 6 Drawing Sheets

(56) References Cited

U.S. PATENT DOCUMENTS

| | | | |
|---|---|---|---|
| 2012/0226558 A1 | 9/2012 | Robyor | |
| 2013/0110392 A1* | 5/2013 | Kosseifi | G01C 21/3415 |
| | | | 701/410 |
| 2013/0246175 A1 | 9/2013 | Bilange | |
| 2014/0040016 A1 | 2/2014 | Amla | |
| 2014/0279021 A1 | 9/2014 | Macneille | |
| 2016/0364812 A1* | 12/2016 | Cao | G06Q 50/30 |
| 2018/0276710 A1* | 9/2018 | Tietzen | G06N 20/00 |
| 2019/0370862 A1 | 12/2019 | Seo | |
| 2021/0042811 A1* | 2/2021 | Lancewicki | G06F 40/58 |

FOREIGN PATENT DOCUMENTS

| | | |
|---|---|---|
| JP | 2009169500 A | 7/2009 |
| JP | 2011238261 A | 11/2011 |
| JP | 2013045169 A | 3/2013 |
| JP | 2014073831 A | 4/2014 |
| JP | 2015535123 A | 12/2015 |
| JP | 2016066358 A | 4/2016 |
| WO | 2017179282 A | 2/2019 |

OTHER PUBLICATIONS

"Research on anticipatory route guidance". IEEE. 2006. (Year: 2006).*

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

ROUTE-BASED INFORMATION SLOTTING BASED ON PREDICTED ACCEPTANCE

BACKGROUND

The present disclosure relates generally to the field of providing location-aware information to a user, and more specifically to providing location-aware information to a user using route-based information slotting based on the predicted acceptance of the user.

Publicizing to moving users, for example users moving in a car, is important to the businesses of restaurants, shops, hotels, etc. which the moving users pass-by. Providing effective location-aware promotions to moving users may allow promoters to better target their promotions to the moving users.

SUMMARY

Embodiments of the present disclosure include a method, computer program product, and system for route-based information slotting based on the predicted acceptance of the user. A processor may generate, based on a predicted route of a user, a timeslot for presenting information to the user. The predicted route may be associated with a route segment, and the timeslot may be associated with the route segment. The processor may match one or more proposals to the timeslot associated with the route segment. The one or more proposals may be matched, at least in part, based on proposal criteria set by a proposal criteria user associated with the proposal. The processor may predict an acceptance potentiality of the user, where the acceptance potentiality is a measure of a likelihood of the user to accept the one or more proposals based on one or more conditions. The processor may select a subset of the one or more proposals. The processor may provide the selected subset of the one or more proposals. The selected subset may be provided, at least in part, based on the acceptance potentiality.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of providing location-aware information to a user, and more specifically to providing location-aware information to a user using route-based information slotting based on the predicted acceptance of the user. While the present disclosure is not necessarily limited to such applications, various aspects of the disclosure may be appreciated through a discussion of various examples using this context.

Advertising to moving users, for example users moving in a car, is important to the businesses of restaurants, shops, hotels, etc. which the moving users pass-by. Providing effective location-aware advertisement to moving users may allow advertisers to better target their advertisements to the moving users. Currently, location-aware advertisement is provided by setting a fixed geological area (e.g., a geofence), reserving an advertisement slot consisting of a time window (e.g., 1-month campaign), and setting advertising content. When moving objects are detected within the geofence, advertisements are delivered to the moving objects/users of the moving objects. For advertisement producers (e.g., advertisers, such as owners of shops, restaurants, hotels, etc.) it is important to provide effective location-aware advertisements that target drivers. Thus, a way to assess the proper timing of delivering advertisements to moving users is important.

In some embodiments, a processor may generate a timeslot for presenting information to a user based on a predicted route of the user. In some embodiments, the predicted route may be associated with a route segment, and the timeslot may be associated with the route segment. The predicted route may be a prediction of a path along which the user (sometimes referred herein as the moving user) may move. The predicted route may be a path between two points, where the first point is a current location of the moving user or a future predicted location of the moving user, and the second point is a destination point at the end of the predicted route or a future predicted location of the moving user. In some embodiments, the destination point at the end of the predicted route may be predicted by the processor. In some embodiments, the destination point at the end of the predicted route may be input by the moving user (e.g., from the moving user inputting a destination location into a GPS enabled device, etc.). In some embodiments, the destination point may be a location set by the processor (for example, the location of a place of business of an advertiser or proposal criteria user (described below)).

In some embodiments, the predicted route may be generated based on information regarding the historical movement of the moving user, current or predicted movement of the moving user in a particular direction, current or predicted movement of the moving user along a known path (such as, for instance, along a road), or any combination thereof. In some embodiments, the predicted route may be generated in real-time or close to real-time. In some embodiments, the predicted route may be divided into one or more route segments which are portions of the predicted route. The predicted route may be segmented into the one or more route segments based on distance, the time that the moving user is predicted to remain in the segment, a predetermined number of segments, a predetermined number of segments per time period or distance, segments based on the proximity of locations/objects on a map, or any other criteria set by the moving user, a proposal criteria user (described below), or an administrator of the system for providing location-aware information which includes the processor. In some embodiments, a timeslot may be generated by the processor and may be associated with the route segment.

As an example, a moving user may be moving in a vehicle along a predicted route (e.g., predicted based on historical data indicating that the moving user historically moves along a road and based on GPS data indicating that the moving user is currently moving eastbound on the road) between the current location of the moving user and a destination point (e.g., a point which is the location of a restaurant located east of the current location of the moving user). The predicted route of the moving user may, for example, be divided into mile-long route segments, and a timeslot may be associated with each of the route segments.

In some embodiments, the processor may match one or more proposals, for presenting information, to the timeslot associated with the route segment. In some embodiments, the one or more proposals may be matched, at least in part, based on proposal criteria set by a user associated with the proposal (sometimes referred to herein as the proposal criteria user). The one or more proposals may include information that is to be transmitted to the moving user to be presented (e.g., displayed visually or played auditorily) to the moving user.

For example, one of the proposals may be an advertisement for a restaurant located at the destination point of the route segment. The proposal criteria user for that proposal may be the owner of the restaurant. The restaurant owner may set proposal criteria (e.g., criteria for matching the advertisement to the timeslot of a moving user) relating to the movement of the moving user along the predicted route or based on other data about the moving user which may be available to the system for providing location-aware information including the processor.

Furthering the example, the proposal criteria may relate to an assessment of the level of interest the moving user has in food. The level of interest in food of the moving user may be assessed based on searches conducted by the moving user for restaurants on the vehicle's computer system or GPS, historical information collected about the moving user indicating that the moving user stops for food during a particular time period, data collected about the moving user indicating that the moving user has previously obtained food from the specific restaurant intending to advertise to the moving user, or any other data which the proposal criteria user has ascertained or believes correlates with the interest the moving user has in food.

The proposal criteria user may set, negotiate, or select the conditions under which the information that is intended to be transmitted to the moving user (e.g., the proposal or the advertisement) is matched with a timeslot for a moving user. In some embodiments, the processor may provide information to the proposal criteria user about a timeslot associated with a route segment for a moving user (or the processor may provide other information to the proposal criteria user about the moving user which identifies the moving user and describes some characteristics of the moving user based on which the proposal criteria user may want to send a proposal to the moving user).

In some embodiments, the proposal criteria user may provide a proposal and provide proposal criteria for matching the proposal with a timeslot of a moving user based, at least in part, on information provided about the timeslot, the route segment, and/or the moving user. In some embodiments, the proposal criteria user may provide rule-based proposal criteria where the processor may automatically match a proposal to a timeslot for a moving user based on specified rules and information about the moving user. In this way, one or more proposals may be matched to a timeslot without first providing the proposal criteria user with information about a specific moving user (e.g., the predicted route of the moving user, the timeslot of the moving user, or other information about the moving user).

In some embodiments, the processor may predict an acceptance potentiality of the moving user. In some embodiments, the acceptance potentiality may be a measure of the likelihood of the moving user to accept the one or more proposals in the near future (e.g., a day, a week, etc.). In some embodiments, a proposal (e.g., advertisement for a restaurant) may not be presented to the moving user unless the moving user accepts to display or play/hear the proposal. In some embodiments, the acceptance potentiality may be expressed as a numerical range or as a binary output. In some embodiments, measuring the acceptance potentiality may involve determining whether a threshold is met.

In some embodiments, the acceptance potentiality may be associated with an acceptance window, where the acceptance window is a time period during which the moving user may accept the one or more proposals. For example, an acceptance window of four seconds may mean that the moving user may accept the proposal within the four second time window and afterwards play the proposal. After the acceptance window has passed, the moving user may no longer accept to display the proposal. In some embodiments, the acceptance window may be variable. In some embodiments, the acceptance window may be determined by an artificial intelligence machine. For example, the artificial intelligence machine may determine the acceptance window based on the conditions of the moving user and/or the conditions of the surroundings of the moving user at or around the time that a proposal is to be provided to the moving user. In some embodiments, the acceptance window may be set by the administrator of the system for providing location-aware information.

In some embodiments, the likelihood of the moving user to accept one or more proposals (e.g., accept to display or play the advertisements) may be measured by using an artificial intelligence machine which has been trained to predict the likelihood of the moving user to accept the one or more proposals in the near future (e.g., within the acceptance window) based on one or more conditions. In some embodiments, the one or more conditions are a condition of the moving user.

For example, the conditions of the moving user may include biological signals of the moving user, such as the heart rate or blink rate of the moving user. As another example, conditions of the moving user may include data about the vehicle in which the moving user is moving. For example, movement or location tracking systems in the vehicle (which may detect velocity, longitudinal acceleration, lateral acceleration, steering angle, brake duration, accelerator duration in a given time period, etc.) may detect that the driver is driving in a manner indicating that the driver may be tired (e.g., crossing lane dividers) or that the driver has been driving for a long time period without stopping. As another example, the moving user may be using a Bluetooth connection to speak on a mobile phone and may be unlikely to accept the proposal in the near future (e.g., within the next five minutes, etc.).

In some embodiments, the one or more conditions may be a condition of surroundings in which the moving user is moving. In some embodiments, the conditions of the surrounding may include information about surrounding vehicles (e.g., information indicating that there is a traffic jam on the road or that traffic is moving in a stop and go manner, which may be obtained by sensors on the moving vehicle tracking the average velocity of the vehicles in front, behind, or on the sides of the moving vehicle). As another example, the condition of the surrounding may be ascertained from other information sources, including a clock (e.g., indicating that it is very late at night), a weather report (e.g., indicating that it is a hot day), emergency management or government agencies (e.g., indicating that there are hazards such as wildfires in the certain areas and those areas must evacuate), or other event reports or calendars (e.g., a calendar of events for a sports arena indicating when large events and which particular events will be held at the sports arena). Information about any or all of these conditions may be used to determine the likelihood of the moving user to accept a proposal.

In some embodiments, the processor may select a subset of the one or more proposals. The subset of the one or more proposals may be selected based on selection criteria of the system administrator (being utilized by the processor). In some embodiments, the system administrator or processor is in communication with an artificial intelligence machine which helps with this selection. The selected subset of the one or more proposals may include all of the one or more proposals, some of the one or more proposals, or none of the one or more proposals. The selection criteria of the system administrator may include any conditions that facilitate administration of the system. For example, the selection criteria may reduce the number of proposals matched to a timeslot if there are more proposal matched to a timeslot than can be presented to the moving user while the moving user is in the route segment associated with the timeslot.

In some embodiments, the processor may provide the selected subset of the one or more proposals based, at least in part, on the predicted acceptance potentiality. For example, the acceptance potentiality may be used to predict the likelihood that the moving user will accept an advertisement within a ten second time period. In some embodiments, if the acceptance potentiality exceeds a threshold, the selected subset of the one or more proposals may be provided to the moving user.

In some embodiments, the proposals may be provided to a device of the moving user (e.g., the car of the moving user). In some embodiments, once the moving user is provided with a proposal (e.g., a proposal in the selected subset of the one or more matched proposals), the moving user may accept to display or play (visually or auditorily) the proposal. For example, the advertisement may be displayed or played by a device in proximity to the moving user (e.g., the car's speaker or video display system). Although examples are provided of a moving user moving in a vehicle (e.g., a car, truck, bus, etc.), the moving user may be moving in a variety of ways powered by human or non-human means (e.g., scooter, bicycle, electric scooter, electric bicycle, Segway, automated walkway, or even walking by foot) and may, for example, receive, play, or display any proposals on a portable computing device (e.g., a tablet, smartphone, mobile phone) having (or working in connection with) a speaker and/or display (e.g., headphones and/or smart glasses).

In some embodiments, the processor may select a subset of the one or more proposals based on numerous parameters. For example, the system administrator may select the subset of the one or more proposal based on revenue associated with the advertisement (described below); the source of the advertisements; the number of advertisements, etc. Furthering the example, the processor may optimize: the number of advertisements sent to each moving user; the revenue generated by the advertisements; the number of advertisers from which the moving user receives advertisements; continuity so that the moving user receives advertisements from advertisers from whom the moving user had received advertisements in previous route segments, etc.

Continuing the example, the optimization may involve solving a combinatorial optimization problem like a knapsack problem. In some embodiments, selection of a subset of the one or more proposals (for example, by optimizing an optimization parameter) may occur before the moving user accepts or declines to accept a set of proposals. In some embodiments, selection of a subset of the one or more proposals (for example, by optimizing an optimization parameter) may occur after the moving user accepts or declines to accept a set of proposals.

For example, conditions of the moving user may prevent the moving user from playing the information in a proposal (e.g., driving conditions abruptly change because of a car accident) and/or time does not permit all of the proposals in the set of proposals matched to the timeslot to be played. In such a case, the order in which the proposals in the selected subset of the one or more proposals is to be presented may be selected (for example, to optimize an optimization parameter) so that in case all of the proposals cannot actually be presented to the moving user, some of the proposals may be prioritized over others.

In some embodiments, the proposal criteria, based on which one or more proposals are matched to a timeslot, may be based, at least in part, on a probability of arrival of the moving user to the route segment. For example, the proposal criteria user may be a store owner with limited resources who has a preference to advertise the store to probable customers. The store owner may set proposal criteria that factors in the probability of arrival of the moving user to the specified route segment (e.g., the route segment associated with a timeslot for which one or more proposals have been matched based on proposal criteria set by the proposal criteria user).

In some embodiments, the probability of arrival may measure the degree of confidence in predicting the route of the moving user. The probability of arrival of the moving user to the specified route segment may be assessed in numerous ways. For example, if the moving user is far away from the restaurant (or the route segment associated with the timeslot), on a route with multiple possible paths where some paths do not bring the moving user to the specified route segment, or there is less historical data regarding the moving user's historical travel routes, there may be less confidence that the moving user will arrive to the specified route segment. In some embodiments, the probability of arrival may be expressed by a range of numerical value. In some embodiments, the probability of arrival may be expressed by a set of confidence values where the probability of the moving user arriving to the route segment exceeds one or more thresholds.

In some embodiments, the proposal criteria, based on which one or more proposals are matched to a timeslot, may be based, at least in part, on a predicted arrival time of the moving user to the route segment. In some embodiments, based on the predicted route and the speed of the moving vehicle, a time by which the moving user is predicted to enter the specified route segment may be predicted. As an example, a restaurant owner may set proposal criteria so that one or more proposals (e.g., advertising the restaurant) are matched to a timeslot associated with a route segment based on time of arrival of the moving user to the route segment. For instance, the restaurant owner may want to target one proposal advertising entrees to moving users who enter the vicinity of the restaurant (e.g., enter a route segment) around the time of a meal. The restaurant owner may want to target a second proposal advertising coffee to a moving user who enters the vicinity of the restaurant (e.g., enter a route segment) in between mealtimes.

In some embodiments, the methods disclosed herein may further involve analyzing the predicted route of the moving user. In some embodiments, analyzing the predicted route of the moving user may include assessing the proximity of the moving user to points of interest along the predicted route. In some embodiments, the proposal criteria may be based on the predicted proximity of the moving user to points of interest. For example, a restaurant owner may want to know about points of interest along a predicted route of the moving user, where the points of interests are places of business of competitors. The proposal criteria user (e.g., the restaurant owner) may have specific advertisements (e.g., proposals) that she would like to send to a moving user based, at least in part, on the proximity of the moving user to a competitor. For example, the restaurant owner may set proposal criteria that when the moving user passes by a competitor, the moving user should be matched with an advertisement that indicates the proximity of the restaurant owner's restaurant and the variety and quality of the restaurant's food to the moving user. As another example, other proposal criteria may set conditions that the closer the moving user gets to the restaurant owner's restaurant, after passing the competitor's place of business and not stopping, the more frequently advertisements should be matched with timeslots of the moving user to increase targeted advertisement to the moving user.

In some embodiments, providing the selected subset of the one or more proposals may involve identifying that an acceptance duration is met. In some embodiments, an acceptance duration is met when there is an acceptable duration of time for each, any, or all of the proposals in a selected subset to be presented to the moving user. The acceptance duration may factor in the amount of time for which a proposal needs to be played or displayed (e.g., an advertisement video that is 40 seconds in duration or an advertisement audio clip which is 15 seconds in duration) and the time that the driver may take to accept the proposals (e.g., the acceptance window). Whether the acceptance duration is met may be assessed before, during, or after predicting the acceptance potentiality of the moving user.

For example, the selected subset of proposals may be provided to the moving user's vehicle when the moving user is within the target route segment (e.g., the route segment associated with a timeslot for which one or more proposals were matched), or at some point prior to the moving user being in the target route segment. Once the moving user is in the route segment, conditions may not permit the moving user to accept the selected subset of proposals during the entire time period that the moving user is moving along the route segment. After the moving user accepts the selected subset of proposals and before displaying or playing the selected subset of proposals to the moving user, the processor may identify whether the predicted duration of time that the moving user is to remain in the route segment is sufficient to present all, each, or some of the proposals in the selected subset of proposals.

In some embodiments, providing the selected subset of the one or more proposals may involve confirming that the moving user is in a target route segment (or about to enter the route segment). In some embodiments, confirmation that the moving user is in the target route segment may be based on sensor data tracking the location of the moving user. For example, it is possible that the route along which the moving user moved has changed from the predicted route, and the moving user never enters the route segment or does not enter the route segment in a predicted time period. Thus, in some embodiments, before each, all, or some of the selected proposals are presented to the moving user, it may be confirmed that the moving user is in the target route segment.

In some embodiments, the systems and methods described herein may match, select, and provide proposals to a moving user for more than one timeslot. In some embodiments, the processor may divide the predicted route of the moving user into multiple route segments. In some embodiments, the processor may generate multiple timeslots for presenting information to the moving user, where each of the timeslots is associated with a route segment.

In some embodiments, the multiple timeslots (some timeslots or all timeslots) associated with the predicted route of a moving user may be matched with one or more proposals for presenting information. In some embodiments, multiple acceptance potentialities of the moving user may be predicted. For example, at least one acceptance potentiality may be predicted for each timeslot for which one or more proposals have been matched or, for which, a subset of the one or more proposals has been selected.

In some embodiments, the systems and methods described herein may match, select, and provide proposals to a moving user where the proposals originate from and/or proposal criteria were set by multiple proposal criteria users. The one or more proposals matched to a timeslot and the subset of the one or more proposals selected for a timeslot may be from one proposal criteria user or multiple proposal criteria users.

In some embodiments, the methods disclosed herein may further involve providing feedback regarding whether the proposals in the selected subset of the one or more proposals were accepted by the moving user. For example, once a proposal is displayed visually or played auditorily to the moving user (or the moving user has declined to display or play the proposal), data indicating that the proposal was presented (or not) to the moving user may be generated, saved in the moving user's computer system (e.g., car computer or cell phone), and/or transmitted to an administrator of the system for providing location-aware information. As another example, once the moving user has left a particular route segment, a tally of the proposals presented to the moving user and/or not presented to the moving user may be provided to the administrator of the system for providing location-aware information.

Figure 1:
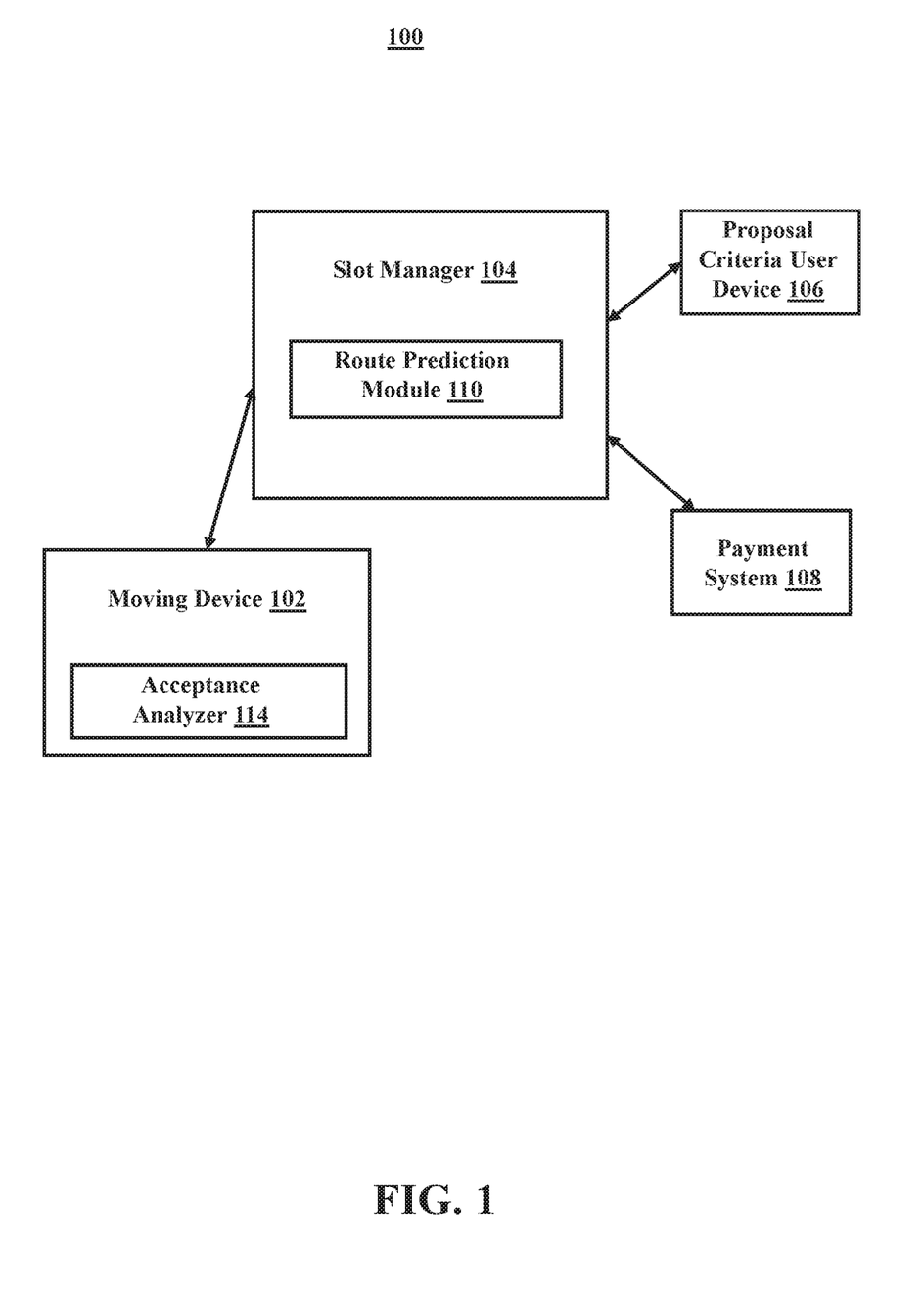
FIG. 1 is a block diagram of an exemplary system for route-based information slotting, in accordance with aspects of the present disclosure.

Referring now to FIG. 1, illustrated is a block diagram of a system 100 for route-based speculative information slotting. System 100 includes a moving device 102, a slot manager 104 arranged to provide proposals to present information (e.g., advertisements) to moving device 102, a proposal criteria user device 106, and a payment system 108. In some embodiments, each of the above-mentioned elements 102-108 of the system 100 may be connected by a network. The slot manager 104 has a route prediction module 110 which collects data from the moving device 102 and predicts the route of the moving device 102. The data collected includes information about the location, movement, and direction of movement of the moving device 102 and may be transmitted from the moving device 102. The route prediction module 110 is involved in determining one or more route segments for a predicted route, the probability that the moving device 102 will pass through a particular route segment, a predicted time window in which the moving device is predicted to enter and exit the route segment, and the locations of points of interest along or in proximity to the predicted route. As system 100 is arranged to provide route-based speculative information slotting for more than one moving device 102, the route prediction module labels each moving device 102 with a label to identify the moving device.

The slot manager 104 generates one or more timeslots for the moving user where the timeslots are associated with one or more route segments associated with the predicted route of the moving user. The slot manager 104 matches one or more proposals to a timeslot based, at least in part, on proposal criteria set by a proposal criteria user. Using the proposal criteria device 106, the proposal criteria user may make a request to the slot manager 104 to match a proposal to a timeslot of the moving device 102 based on the requested proposal criteria.

The proposal criteria may specify conditions relating to the moving user or surroundings of the moving user, including arrival time of the moving device into the target timeslot (e.g., the route segment associated with a timeslot for which one or more proposals were matched), probability of arrival into the targeted route segment, probability of the moving user visiting a business in or proximate to the route segment (e.g., a business which is advertising to the moving user), historical data regarding the moving user's behavior (e.g., how often the moving user has visited a business); criteria on how to prioritize multiple proposals (e.g., prioritize which proposals are matched to a timeslot or selected to be provided to the moving user); conditions relating to points of interest in proximity to the target route segment; and/or other information identifying the target moving user of the proposals.

The slot manager 104 is used to select a subset of one or more matched proposals for a timeslot for the moving device 102. The slot manager 104 is used to provide the selected subset of the one or more matched proposals to the moving device 102, where the selected subset of the one or more matched proposals is provided, at least in part, based on a predicted acceptance potentiality for the moving user.

The moving device 102 includes an acceptance analyzer 114 which predicts the acceptance potentiality of the moving user. In some embodiments, the acceptance analyzer 114 is included in the slot manager 104. The acceptance potentiality measures the likelihood that the moving user will accept one or more proposals matched or selected for a timeslot based on one or more conditions. The acceptance analyzer 114 receives data from the moving device 102 and infers the likelihood of the moving user accepting the proposal (e.g., by making a true or false determination) in a time period (for example, in the next n seconds) using multi-variant time-series data with a time window and communicates that acceptance prediction to other parts of the slot manager 104 (for example, so that a proposal can be provided to the moving user).

The acceptance analyzer 114 is a deep learning model that is trained with data about the moving device, biological data about the moving user, and/or properties of the surrounding of the moving device. The acceptance analyzer 114 is trained using input data. The input data may include vehicle sensor data including brake duration, acceleration duration, velocity, steering angle, longitudinal acceleration, and lateral acceleration. The input data may include biological sensor data regarding the heart rate or the skin potential of the moving user. The input data may include data regarding the average speed of surrounding moving devices.

In some embodiments, the input data is obtained at multiple time points in a series. Further, in some embodiments, training users may label whether it is acceptable for the moving user to display or play a proposal containing information at each time point and an output label may be used to determine the acceptance potentiality. For example, if, in a particular time window, the training users label that it is acceptable for the moving user to display or play a proposal for 80% of the time points, the acceptance potentiality may be a binary output indicating that it is acceptable to provide the proposal to the user. It is noted that each time window is of a certain length, and the time windows in the series are moved step by step with a set stride.

In some embodiments, the acceptance analyzer 114 is trained by selecting the length of the training data to be L. Further, data is collected from the vehicle, which includes sensor data about the vehicle's movements, the driver's bio signals, and regarding other vehicle's movements. In some embodiments, the time intervals of all data are adjusted by interpolating or summarizing data. In such an embodiment, the time-window of the input and the output are then set to $T\_i$ and $T\_o$. The index of time is set for $i=0$. In some embodiments, if all time slices of input and output are generated (e.g., $i \geq L-(T\_i+T\_o)$), then the input and output data are divided into train/test/validate for learning. In another embodiment, if all time slices of input and output are not generated (e.g., $i \leq L-(T\_i+T\_o)$), then an input slice is created from the time $t=i$ with the timewindow $T\_i$ ($i \leq t \leq i+T\_i$).

In some embodiments, an output slice from the time $t=i+T\_i$ with the time-window $T\_o$ $i+T\_i \leq t < (i+T\_i+T\_o)$ is obtained. The acceptance rate with the output slice is then calculated. If the acceptance rate is over the threshold, then the acceptance is determined to be true. If the acceptance rate is not over the threshold, then the acceptance is determined to be false.

In some embodiments, the acceptance analyzer 114 utilizes a convolutional neural network ("CNN") to extract features and long short term memory ("LSTM") to interpret the time series of the features. In some embodiments, an output layer exploits softmax as the activation function for binary-class classification. Various parameters and hyperparameters may be specified for the CNN, including: the number of input steps and the corresponding time in seconds, the number of outputs (e.g., two for a binary classification), use of a particular optimizer (e.g., a Nesterov Adam optimizer), batch size, or epoch.

In some embodiments, information about whether a proposal was accepted by the moving user is provided by the moving device 102 to the slot manager 104 and to a payment system 108. In some embodiments, the payment system 108 is used to determine, based in part on the number of proposals accepted by the moving user, how much payment a proposal criteria user may need to make for the proposals that were accepted by the moving user (e.g., advertisements that were displayed or played to the moving user). In some embodiments, the payment system 108 may be used to determine payment amounts for multiple proposal criteria users (e.g., multiple advertisers), to tally how many and which advertisements were provided to and/or accepted by moving users, and to bill and collect payment from proposal criteria users. Thus, the proposal criteria user may be informed, not only of any payment due for the proposals played by the moving user, but also about which proposals associated with which selection criteria were provided to and accepted by moving users.

In some embodiments (not illustrated herein for the sake of brevity), the slot manager 104 may, to match one or more proposals to one or more timeslots, use a slot generating module to generate timeslots based on each proposal criteria user's requests (e.g., based on type of target vehicle, target route, target location, probability of arrival, or time of arrival to advertiser). If the proposal criteria user specifies a repeat rate (e.g., the rate that the moving user revisits the business of the proposal criteria user), the probability of pass through and the repeat rate are taken into consideration to generate timeslots. In some embodiments, the slot generating module also registers lists of matched proposals to the timeslots based on the proposals of the proposal criteria users. In some embodiments, the proposal criteria users may utilize a user interface to provide proposals or may utilize an automatic proposal and proposal criteria generator using rule-based proposal criteria.

In some embodiments, the slot manager 104 provides timeslots to each proposal criteria user. In such embodiments, the slot manager 104 registers the one or more proposals provided by the proposal criteria users. The slot manager 104 sends lists of matched proposals and links for accessing the proposals to a matched proposal list distribution module. The slot manager 104 may also notify proposal criteria users if information about the available timeslots is updated (for example, if the prediction of the predicted route of the moving user was incorrect). The matched proposal list distribution module extracts lists of matched proposals for each moving user and sends the proposals, a link for the proposals, and a time window for presenting the proposals to the moving user (e.g., a vehicle or moving device of the moving user).

In some embodiments, a provide manager module receives lists of matched proposals, receives information about the time window for presenting the proposals to the moving user, and provides proposals (e.g., advertisements, coupons, etc.) to the moving users at the appropriate time. The provide manager module also sends information about proposals that are accepted by the moving user to a result collection module. The result collection module summarizes payment results and send the results to the payment system. The provide manager module also notifies the slot manager 104 in case the predicted route for a moving user is not correct. This notification provides an opportunity for the proposal criteria user to modify proposal criteria or proposals so that the proposals matched to a timeslot for the moving user may be modified.

It is noted that the system 100 illustrated in FIG. 1 may have advantages over current systems. With systems of the present disclosure, the total available time for presenting information, e.g., advertisements, to a moving user is greater than the total available time for presenting information to a moving user using systems which are based on calculation of current acceptance. The total available time is increased with systems of the present disclosure because the present system is able to predict times when a moving user will be able to accept an advertisement.

Another advantage of the system(s) of the present disclosure is that proposals to be presented may be selected automatically based on the length of the time window available to present the proposal to the moving user. Automatically taking into account the length of time available to present the proposal to the moving user reduces the risk of sudden suspension of advertisement presentation if the time window available for presentation of the advertisement is less than the length of the advertisement. The automatic selection of proposals to be presented may be done by optimization. For example, how much time is available for presenting one or more proposals can be determined (e.g., 15 second, 30 seconds, etc.), and by solving an optimization problem, one or more proposals can be selected to be presented to the moving user in that time period.

Additionally, the system(s) of the present disclosure are advantageous over advertisement methods involving geofencing. In geofencing, a slot for advertising is based on an area near a specific point of interest. An advertisement slot is reserved even for vehicles with low visiting probability (e.g., rate of passing a road of store location× revisiting rate). Additionally, it is difficult to determine the geofencing area. A smaller geofence size restricts advertisement to vehicles near the point of interest and therefore prevents acquisition of new customers. A larger geofence size risks presenting advertisement to vehicles with a low likelihood of visiting.

Figure 2A:
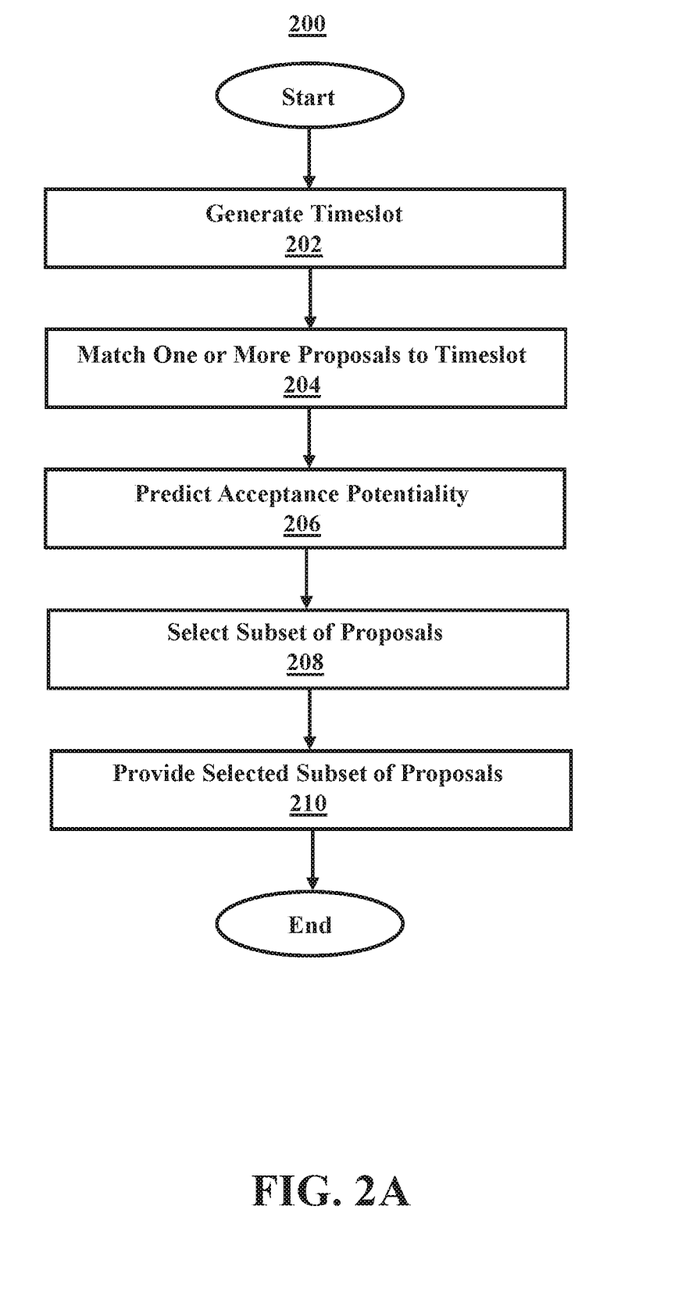
FIG. 2A is a flowchart of an exemplary method for route-based information slotting, in accordance with aspects of the present disclosure.

Referring now to FIG. 2A, illustrated is a flowchart of an exemplary method 200 for providing location-aware information, in accordance with embodiments of the present disclosure. In some embodiments, a processor may perform the operations of the method 200. In some embodiments, method 200 begins at operation 202. At operation 202, a timeslot for presenting information to a user is generated based on the predicted route of the user. The predicted route is associated with a route segment, and the timeslot is associated with the route segment.

In some embodiments, method 200 proceeds to operation 204. At operation 204, one or more proposals for presenting information are matched to the timeslot associated with the route segment. The one or more proposals are matched, at least in part, based on proposal criteria set by a proposal criteria user associated with the proposal. In some embodiments, method 200 proceeds to operation 206 where the processor predicts an acceptance potentiality of the user. The acceptance potentiality is a measure of a likelihood of the user to accept the one or more proposals based on one or more conditions.

In some embodiments, method 200 proceeds to operation 208 where the processor selects a subset of the one or more proposals. In some embodiments, method 200 proceeds to operation 210. At operation 210, the selected subset of the one or more proposals is provided. The selected subset is provided, at least in part, based on the acceptance potentiality.

Figure 2B:
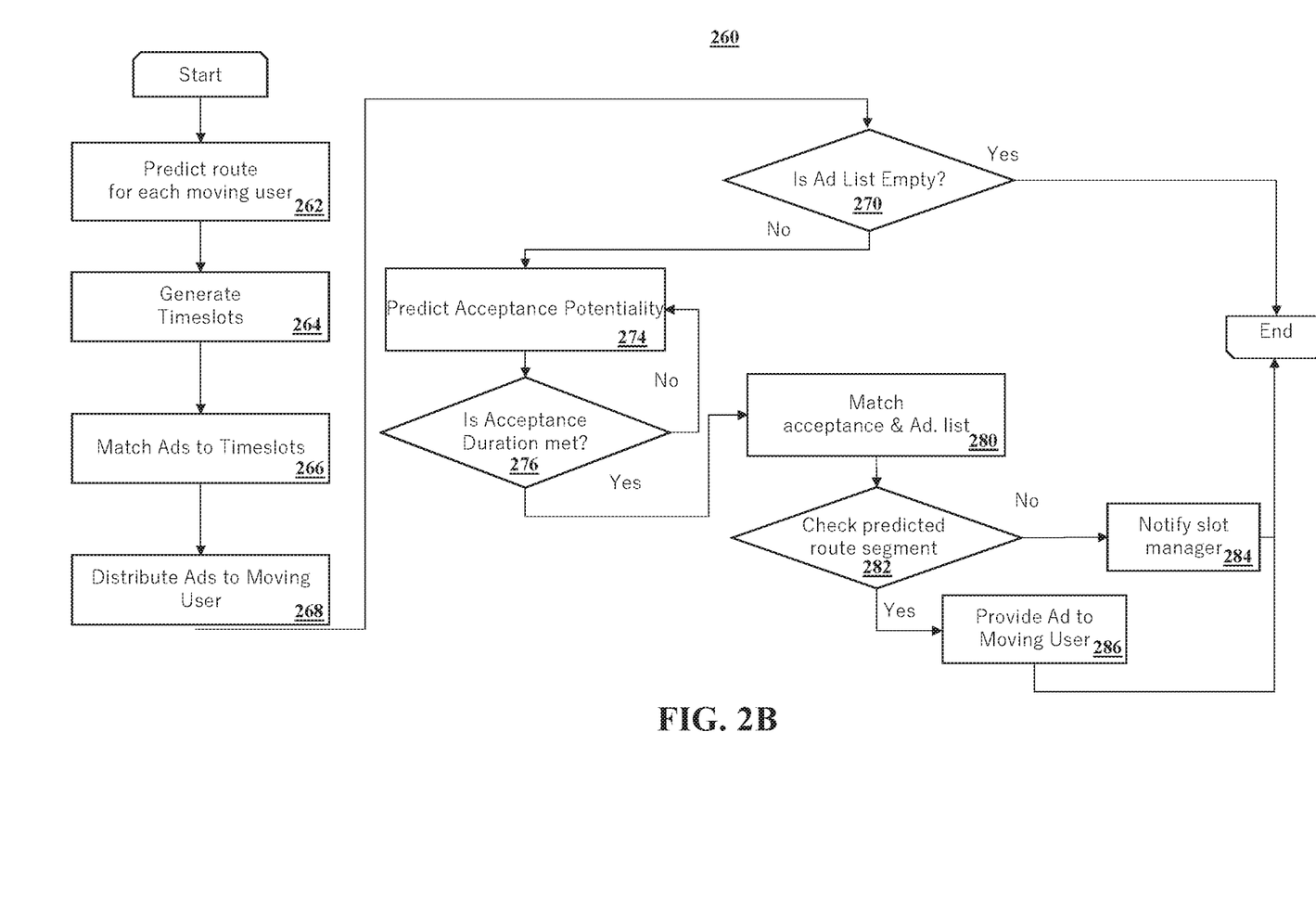
FIG. 2B is a flowchart of an exemplary method for route-based information slotting, in accordance with aspects of the present disclosure.

Referring now to FIG. 2B, illustrated is a flowchart of an exemplary method 260 for providing location-aware information, in accordance with aspects of the present disclosure. It is noted that the method 260 may substantially incorporate portions of the method 200 described in FIG. 2A and/or may be furtherance of the method 200. In some embodiments, method 260 begins at operation 262. At operation 262, a route is predicted for each of multiple moving users. In some embodiments, method 260 proceeds to operation 264. At operation 264, timeslots are generated for each of the multiple moving users. In some embodiments, method 260 proceeds to operation 266. At operation 266, one or more advertisements are matched to timeslots for each of the multiple moving users. In some embodiments, method 260 proceeds to operation 268. At operation 268, the one or more advertisements are distributed to the vehicles of the multiple moving users.

In some embodiments, method 260 proceeds to decision block 270. At decision block 270, a processor in each vehicle determines whether the list of advertisements for each vehicle is empty. In some embodiments, if the list of advertisements for a vehicle is empty, the method 260 ends. At operation 274, if the list of advertisements of a vehicle is not empty, an acceptance analyzer will be used to predict the likelihood of the user to accept one or more advertisements in the advertisement list. In some embodiments, method 260 proceeds to decision block 276. At decision block 276, the processor will determine if the acceptance duration is met (e.g., is there enough time to play one or more advertisements). In some embodiments, if the acceptance duration is not met, the acceptance analyzer will again be used to predict the likelihood of the user to accept one or more advertisements (e.g., at a later time or different advertisements).

In some embodiments, method 260 proceeds to operation 280. At operation 280, if the acceptance duration met, the driver's acceptance will be matched with the list of advertisements. For example, advertisements for which the acceptance duration is met and advertisements which have been selected based on the selection criteria are sent to the moving user. In some embodiments, method 260 proceeds to decision block 282. At decision block 282, it will be determined if the driver is in the predicted route segment. In some embodiments, method 260 proceeds to operation 284. At operation 284, if the driver is not in the route segment, the slot manager will be notified. In some embodiments, method 260 proceeds to operation 286. At operation 286, if the driver is in the predicted route segment, the advertisement will be provided to the driver.

As discussed in more detail herein, it is contemplated that some or all of the operations of methods 200 and 260 may be performed in alternative orders or may not be performed at all; furthermore, multiple operations may occur at the same time or as an internal part of a larger process.

It is noted that the present technology may be implemented within or as part of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
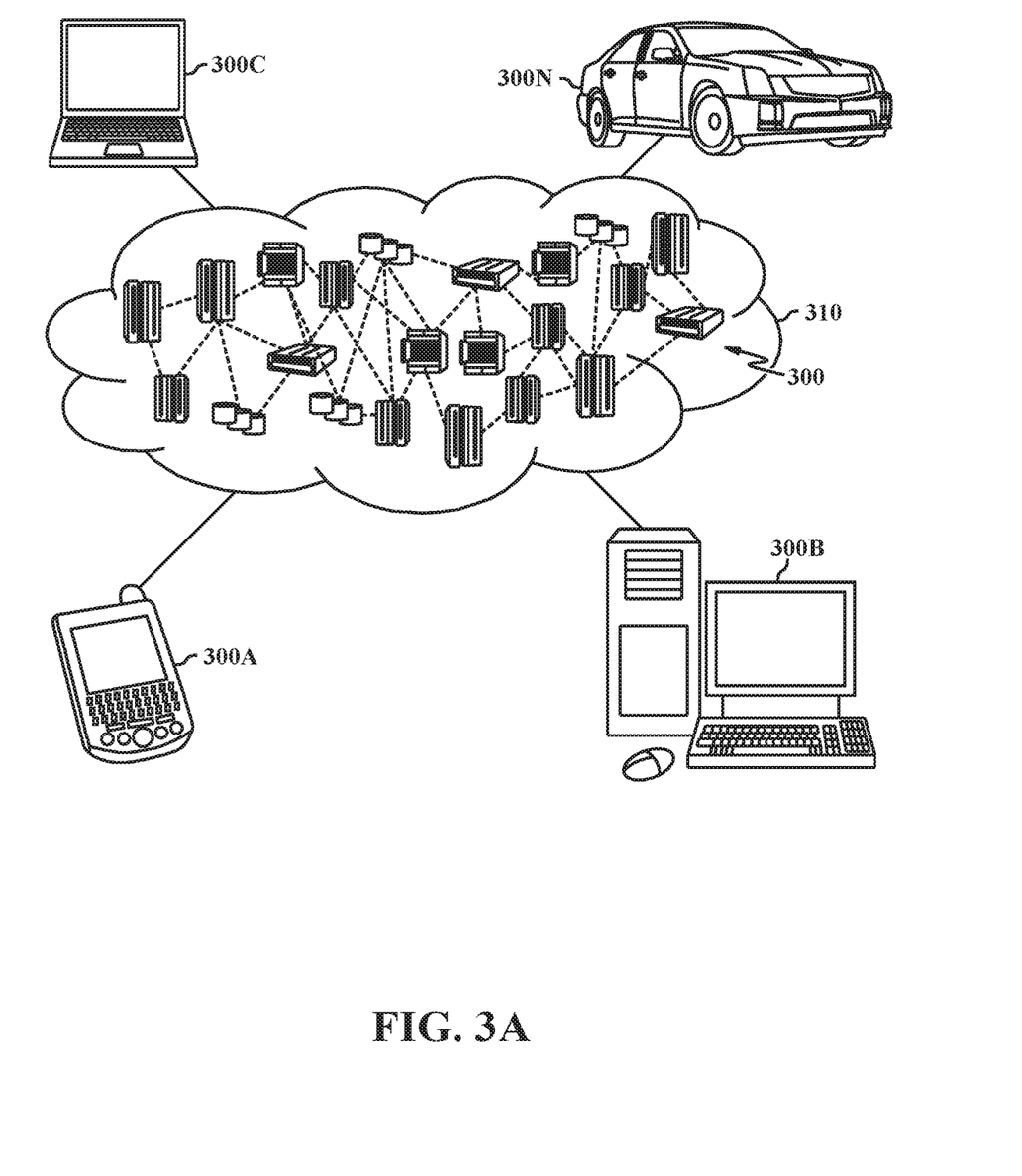
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
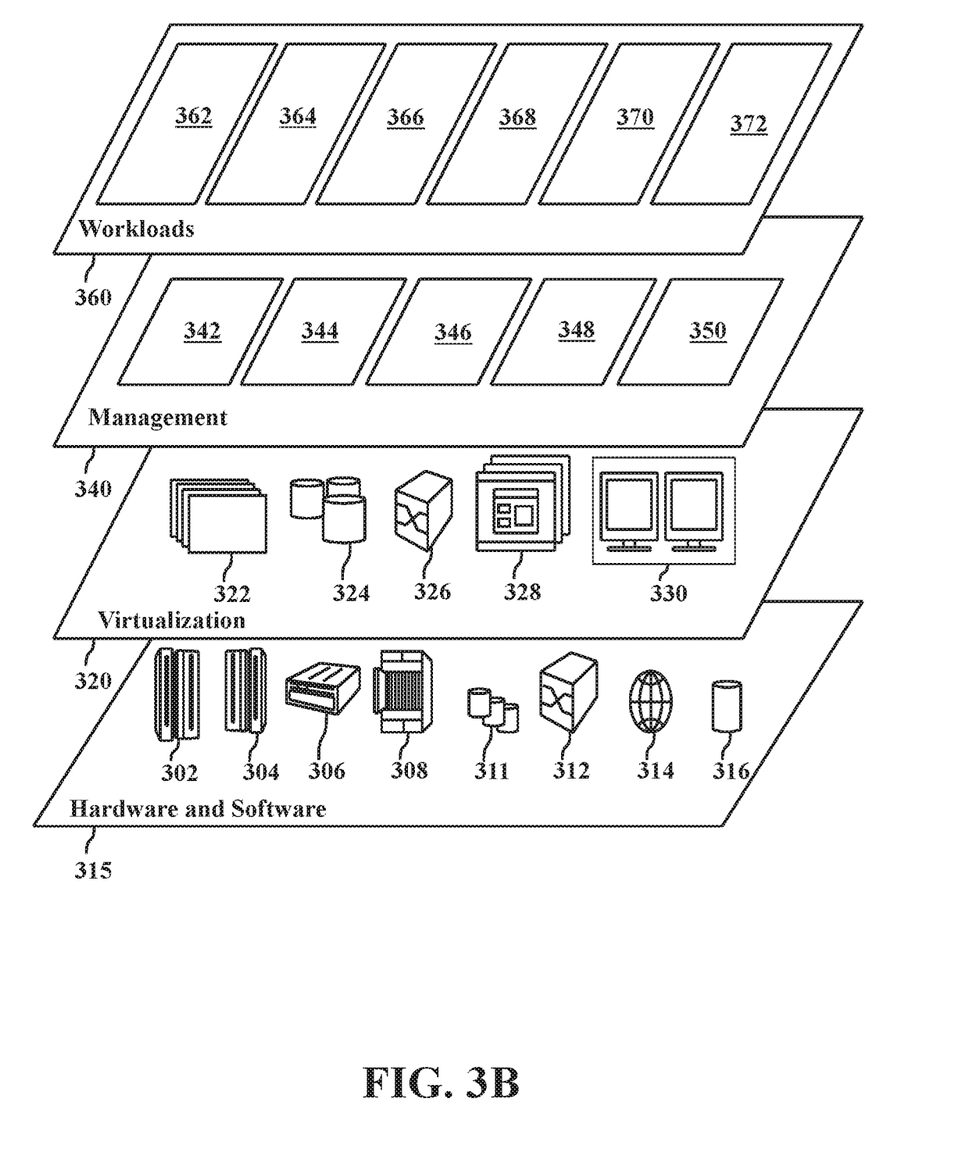
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and route-based information slotting 372.

Figure 4:
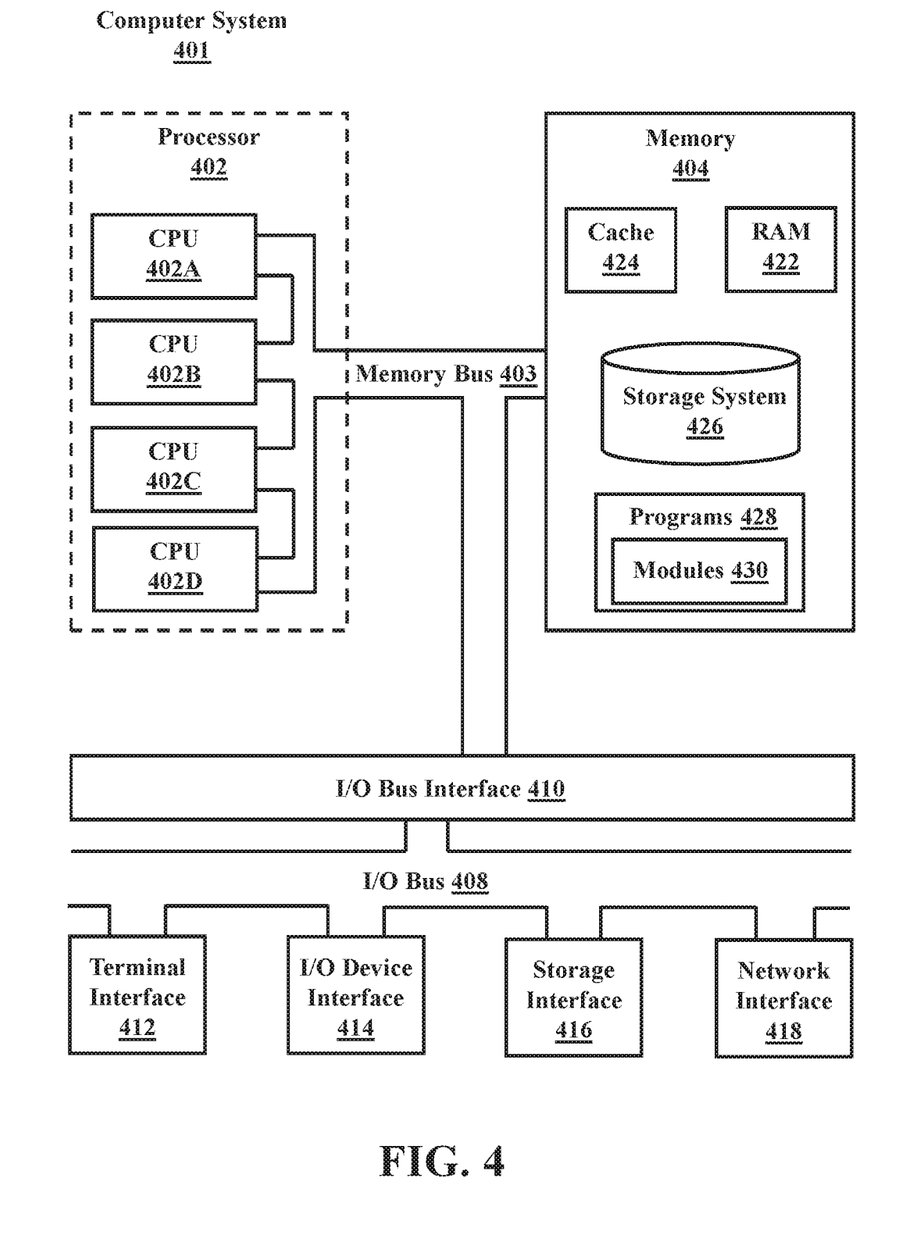
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
    generating, by a processor, based on a predicted route of an automobile computer system, a timeslot for presenting information to a moving user associated with the automobile computer system, wherein the predicted route is associated with a route segment, and wherein the timeslot provides a time range for presenting the information to the moving user associated with the automobile computer system that is associated with a predicted time of arrival to the route segment;
    matching one or more proposals to the timeslot associated with the target route segment, wherein the one or more proposals are matched, at least in part, based on proposal criteria set by a proposal criteria user associated with the proposal;
    predicting an acceptance potentiality of the moving user, wherein the acceptance potentiality is a measure of a likelihood of the moving user to accept the one or more proposals based on one or more conditions, wherein the acceptance potentiality is associated with an acceptance window based, at least in part, on a time period associated with the automobile computer system and the moving user accepting the one or more proposals;
    selecting a subset of the one or more proposals, based at least in part on the acceptance potentiality of the moving user;
    optimizing the selected subset of the one or more proposals, wherein the subset of the one or more proposals includes one or more prioritized proposals based on one or more abrupt route segment condition changes of the predicted route of the automobile computer system;
    confirming the route segment is a target route segment, wherein the target route segment is the route segment the automobile computer system and the moving user is on and is associated with the one or more prioritized proposals; and
    displaying to the moving user, using the automobile computer system, the selected subset of the one or more proposals.

2. The method of claim 1, wherein the proposal criteria are based, at least in part, on a probability of arrival of the moving user to the route segment.

3. The method of claim 1, wherein the proposal criteria are based, at least in part, on a predicted arrival time of the moving user to the route segment.

4. The method of claim 1, further comprising:
    analyzing the predicted route of the moving user, wherein the analyzing includes assessing the proximity of the moving user to points of interest along the predicted route.

5. The method of claim 1, wherein one of the one or more conditions is a condition of the moving user.

6. The method of claim 1, wherein selecting the subset of the one or more proposals is based, at least in part, on optimizing an optimization parameter.

7. The method of claim 1, wherein providing the selected subset of the one or more proposals to the moving user comprises:
    identifying that an acceptance duration is met.

8. The method of claim 1, wherein providing the selected subset of the one or more proposals to the moving user comprises:
    confirming that the moving user is in a predicted route segment, wherein confirmation that the moving user is in the predicted route segment is based on sensor data tracking the location of the moving user.

9. The method of claim 1, further comprising:
    providing feedback regarding whether a proposal in the selected subset of the one or more proposals was accepted by the moving user.

10. The method of claim 1, further comprising:
    generating one or more route segments, wherein the one or more route segments include the route segment; and matching proposals to respective route segments of the one or more route segments, wherein the proposals include the one or more proposals.

11. A system comprising:

a memory; and a processor in communication with the memory, the processor being configured to perform operations comprising:

generating, based on a predicted route of an automobile computer system, a timeslot for presenting information to a moving user associated with the automobile computer system, wherein the predicted route is associated with a route segment, and wherein the timeslot provides a time range for presenting the information to the moving user that is associated with a predicted time of arrival to the route segment;

matching one or more proposals to the timeslot associated with the route segment, wherein the one or more proposals are matched, at least in part, based on proposal criteria set by a proposal criteria user associated with the proposal;

predicting an acceptance potentiality of the moving user, wherein the acceptance potentiality is a measure of a likelihood of the moving user to accept the one or more proposals based on one or more conditions, wherein the acceptance potentiality is associated with an acceptance window based, at least in part, on a time period associated with the automobile computer system and the moving user accepting the one or more proposals;

selecting a subset of the one or more proposals, based at least in part on the acceptance potentiality of the moving user;

optimizing the selected subset of the one or more proposals, wherein the subset of the one or more proposals includes one or more prioritized proposals based on one or more abrupt route segment condition changes of the predicted route of the automobile computer system;

confirming the route segment is a target route segment, wherein the target route segment is the route segment the automobile computer system and the moving user is on and is associated with the one or more prioritized proposals; and displaying to the moving user, using the automobile computer system, the selected subset of the one or more proposals.

12. The system of claim 11, wherein selecting the subset of the one or more proposals is based, at least in part, on optimizing an optimization parameter.

13. The system of claim 11, wherein providing the selected subset of the one or more proposals to the moving user comprises:

identifying that an acceptance duration is met.

14. The system of claim 11, wherein providing the selected subset of the one or more proposals to the moving user comprises:

confirming that the moving user is in a predicted route segment, wherein confirmation that the moving user is in the predicted route segment is based on sensor data tracking the location of the moving user.

15. The system of claim 11, further comprising:

providing feedback regarding whether a proposal in the selected subset of the one or more proposals was accepted by the moving user.

16. A computer program product comprising a computer readable storage medium having program instructions embodied therewith, the program instructions executable by a processor to cause the processor to perform operations, the operations comprising:

generating, based on a predicted route of an automobile computer system, a timeslot for presenting information to a moving user associated with the automobile computer system, wherein the predicted route is associated with a route segment, and wherein the timeslot provides a time range for presenting the information to the moving user that is associated with a predicted time of arrival to the route segment;

matching one or more proposals to the timeslot associated with the route segment, wherein the one or more proposals are matched, at least in part, based on proposal criteria set by a proposal criteria user associated with the proposal;

predicting an acceptance potentiality of the moving user, wherein the acceptance potentiality is a measure of a likelihood of the moving user to accept the one or more proposals based on one or more conditions, wherein the acceptance potentiality is associated with an acceptance window based, at least in part, on a time period associated with the automobile computer system and the moving user accepting the one or more proposals;

selecting a subset of the one or more proposals, based at least in part on the acceptance potentiality of the moving user;

optimizing the selected subset of the one or more proposals, wherein the subset of the one or more proposals includes one or more prioritized proposals based on one or more abrupt route segment condition changes of the predicted route of the automobile computer system;

confirming the route segment is a target route segment, wherein the target route segment is the route segment the automobile computer system and the moving user is on and is associated with the one or more prioritized proposals; and displaying to the moving user, using the automobile computer system, the selected subset of the one or more proposals.

17. The computer program product of claim 16, wherein selecting the subset of the one or more proposals is based, at least in part, on optimizing an optimization parameter.

18. The computer program product of claim 16, wherein providing the selected subset of the one or more proposals to the moving user comprises:

identifying that an acceptance duration is met.

19. The computer program product of claim 16, wherein providing the selected subset of the one or more proposals to the moving user comprises:

confirming that the moving user is in a predicted route segment, wherein confirmation that the moving user is in the predicted route segment is based on sensor data tracking the location of the moving user.

* * * * *